United States Patent
Ma

(10) Patent No.: US 8,954,054 B2
(45) Date of Patent: Feb. 10, 2015

(54) METHOD FOR PROCESSING AND TESTING OF CALLED TERMINAL AND LONG TERM EVOLUTION SYSTEM

(75) Inventor: Wei Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 227 days.

(21) Appl. No.: 13/635,285

(22) PCT Filed: Mar. 18, 2011

(86) PCT No.: PCT/CN2011/071967
§ 371 (c)(1),
(2), (4) Date: Sep. 14, 2012

(87) PCT Pub. No.: WO2011/124108
PCT Pub. Date: Oct. 13, 2011

(65) Prior Publication Data
US 2013/0023266 A1    Jan. 24, 2013

(30) Foreign Application Priority Data

Apr. 9, 2010   (CN) .......................... 2010 1 0145956

(51) Int. Cl.
*H04W 24/00* (2009.01)
*H04W 68/00* (2009.01)
(Continued)

(52) U.S. Cl.
CPC .............. *H04W 68/00* (2013.01); *H04W 48/18* (2013.01); *H04W 60/00* (2013.01); *H04W 76/02* (2013.01)
USPC ..................... 455/423; 455/67.11; 455/67.14; 455/115.1; 455/115.2

(58) Field of Classification Search
CPC ................... H04B 2001/0416; H04B 17/0025; H04B 17/0027; H03G 3/3042
USPC .............. 455/423, 67.11, 67.14, 115.1–115.2
See application file for complete search history.

(56) References Cited

U.S. PATENT DOCUMENTS

2008/0159223 A1   7/2008  Palat et al.
2009/0036131 A1*  2/2009  Diachina et al. .............. 455/436
(Continued)

FOREIGN PATENT DOCUMENTS

CN    101547467 A    9/2009
CN    101569225 A    10/2009
(Continued)

OTHER PUBLICATIONS

International Search Report for PCT/CN2011/071967 mailed on Jun. 23, 2011 in 4 pages.
(Continued)

*Primary Examiner* — Wayne Cai
(74) *Attorney, Agent, or Firm* — Knobbe, Martens, Olson & Bear, LLP

(57) ABSTRACT

The disclosure discloses a method for processing/testing of a called terminal and a Long Time Evolution (LTE) system. The method comprises that: a network side of the LTE system sends a paging message to the terminal residing in an LTE cell which is called by a Circuit Switched (CS) domain service; the terminal establishes a Radio Resource Control (RRC) connection with the network side; the terminal sends to the network side a message for requesting to establish a CS domain service; the network side indicates, to the terminal, carrier frequency information of a Global System for Mobile Communications (GSM) cell to which the terminal needs to be redirected; the terminal sends a channel request message to the GSM cell; the terminal performs routing area updating in the GSM cell; the terminal sends a paging response message to the GSM cell; the terminal establishes the CS domain service in the GSM cell. By using the disclosure, when being called by the CS domain service, the terminal residing in the LTE cell can return to a cell of a corresponding network to establish the CS domain service.

2 Claims, 4 Drawing Sheets

(51) Int. Cl.
*H04W 48/18* (2009.01)
*H04W 60/00* (2009.01)
*H04W 76/02* (2009.01)

(56) References Cited

U.S. PATENT DOCUMENTS

2010/0075678 A1* 3/2010 Akman et al. ............... 455/436
2010/0098023 A1* 4/2010 Aghili et al. ................. 370/331

FOREIGN PATENT DOCUMENTS

| EP | 1 983 789 A1 | 10/2008 |
| JP | 2009-267996 | 11/2009 |
| KR | 2002-0051594 A | 6/2002 |
| WO | WO 2008/053845 | 5/2008 |
| WO | WO 2010/019364 A1 | 2/2010 |
| WO | WO 2010/146464 A1 | 12/2010 |

OTHER PUBLICATIONS

3rd Generation Partnership Project, 3GPP TR 23.879 V.9.0.0 in 60 pages (Mar. 2009).
3rd Generation Partnership Project, 3GPP TS 23.272 V9.3.0 in 10 pages (Mar. 2010).
Extended European Search Report for European Application No. 11765026.7 dated Jan. 27, 2014 in 11 pages.

* cited by examiner

US 8,954,054 B2

1

METHOD FOR PROCESSING AND TESTING OF CALLED TERMINAL AND LONG TERM EVOLUTION SYSTEM

CROSS-REFERENCE TO RELATED APPLICATIONS

This application is the U.S. National Phase application under 35 U.S.C. §371 of International Application PCT/CN2011/071967, filed Mar. 18, 2011, which claims priority to Chinese Patent Application 201010145956.2, filed Apr. 9, 2010.

FIELD OF THE INVENTION

The disclosure relates to the field of communication, and more particularly to a method for processing/testing of called terminal (the terminal being called) and a Long Time Evolution (LTE) system.

BACKGROUND OF THE INVENTION

Currently, as a research project of the $3^{rd}$ Generation Partnership Project (3GPP), complete radio communication standards have been formed for the LTE, and are being promoted gradually in the world.

However, Circuit Switched (CS) domain services are not supported by LTE. Therefore, a terminal cannot directly establish a CS domain call in an LTE cell. If the terminal resides in the LTE cell and herein the terminal is called by a CS domain service, then the LTE system cannot process the call of the CS domain service, thus leading to a call failure.

SUMMARY OF THE INVENTION

The disclosure provides a processing solution for a called terminal to at least solve the problem above.

According to an aspect of the disclosure, a method for processing of called terminal is provided. The method comprises steps of: a network side of an Long Term Evolution (LTE) system sending a paging message to a terminal residing in an LTE cell which is called by a Circuit Switched (CS) domain service; the terminal establishing a Radio Resource Control (RRC) connection with the network side; the terminal sending a message to the network side for requesting to establish the CS domain service; the network side indicating to the terminal carrier frequency information of a Global System for Mobile Communications (GSM) cell to which the terminal needs to be redirected; the terminal sending a channel request message to the GSM cell; the terminal performing routing area updating in the GSM cell; the terminal sending a paging response message to the GSM cell; and the terminal establishing the CS domain service in the GSM cell.

Preferably, the network side indicating to the terminal the carrier frequency information of the GSM cell comprises: the network side sending an RRC connection release message to the terminal, wherein the RRC connection release message carries the carrier frequency information of the GSM cell.

Preferably, a redirection message or a mobile control message in an idle state is carried in the RRC connection release message; and the redirection message or the mobile control message in the idle state indicates the carrier frequency information of the GSM cell.

Preferably, the terminal sending to the network side a message for requesting to establish the CS domain service comprises: the terminal carrying an extended service request message in an uplink (UL) information transfer message sent to

2 the network side, wherein the extended service request message is configured to request to establish the CS domain service.

According to another aspect of the disclosure, a method for testing of called terminal is provided. The method comprises steps of: a network side of an Long Term Evolution (LTE) system sending a paging message to a terminal residing in an LTE cell which is called by a Circuit Switched (CS) domain service; the terminal establishing an Radio Resource Control (RRC) connection with the network side; detecting whether the terminal has sent to the network side a message for requesting to establish the CS domain service wherein if the message has not been sent, the test is failed; the LTE network side indicating carrier frequency information of a Global System for Mobile Communications (GSM) cell to which the terminal needs to be redirected; detecting whether the terminal has sent a channel request message in the GSM cell, wherein if the message has not been sent, the test is failed; the terminal performing routing area updating in the GSM cell; and detecting whether the terminal has sent a paging response message to the GSM cell after the routing area updating is performed in the GSM cell, wherein if the message has not been sent, the test is failed.

Preferably, detecting whether the terminal has sent to the network side the message for requesting to establish the CS domain service comprises: detecting whether the terminal has sent an uplink (UL) information transfer message to the network side, and detecting whether the UL information transfer message carries an extended service request message, wherein the extended service request message is configured to request to establish the CS domain service.

Preferably, a system simulator simulates the LTE cell and the GSM cell.

Preferably, the terminal is connected to the system simulator by an interface of the LTE cell or the GSM cell.

According to a third aspect of the disclosure, an LTE system is provided, wherein the network side is configured to send a paging message to the terminal residing in an LTE cell which is called by a Circuit Switched (CS) domain service; and the terminal establishes an Radio Resource Control (RRC) connection with the network side; the terminal is configured to send a message to the network side for requesting to establish the CS domain service; the network side indicates carrier frequency information of a GSM cell to which the terminal needs to be redirected; the terminal is further configured to send a channel request message to the GSM cell; the terminal is further configured to perform routing area updating in the GSM cell; the terminal is further configured to send a paging response message to the GSM cell; and the terminal is further configured to establish the CS domain service in the GSM cell.

By employing the solution of the disclosure, the LTE network side sends carrier frequency information of the GSM cell to the terminal, and the terminal establishes the CS domain service in the GSM cell. Thus, the solution solves the problem in the related technology that when the terminal residing in the LTE cell is called by a CS domain service, the LTE cannot process the call, thus leading to a call failure. Hence, by the solution of the disclosure, when being called by the CS domain service, the terminal residing in the LTE cell can return to a cell of a corresponding network to establish the CS domain service.

BRIEF DESCRIPTION OF THE DRAWINGS

The drawings illustrated herein provide further understanding of the disclosure and constitute a part of the application. The exemplary embodiments of the disclosure and the illustrations thereof are used for explaining the disclosure, instead of imposing an improper limitation to the disclosure. In the drawings.

DETAILED DESCRIPTION OF THE EMBODIMENTS

The disclosure will be described in detail hereinafter with reference to the drawings and in combination with the embodiments. It should be noted that, if there is no conflict, the embodiments in the application and the characteristics in the embodiments can be combined with one another.

In the embodiments below, a terminal resides in an LTE cell. The terminal is called by a CS domain service when the terminal is in a standby state (or an idle state).

Embodiment 1

Figure 1:
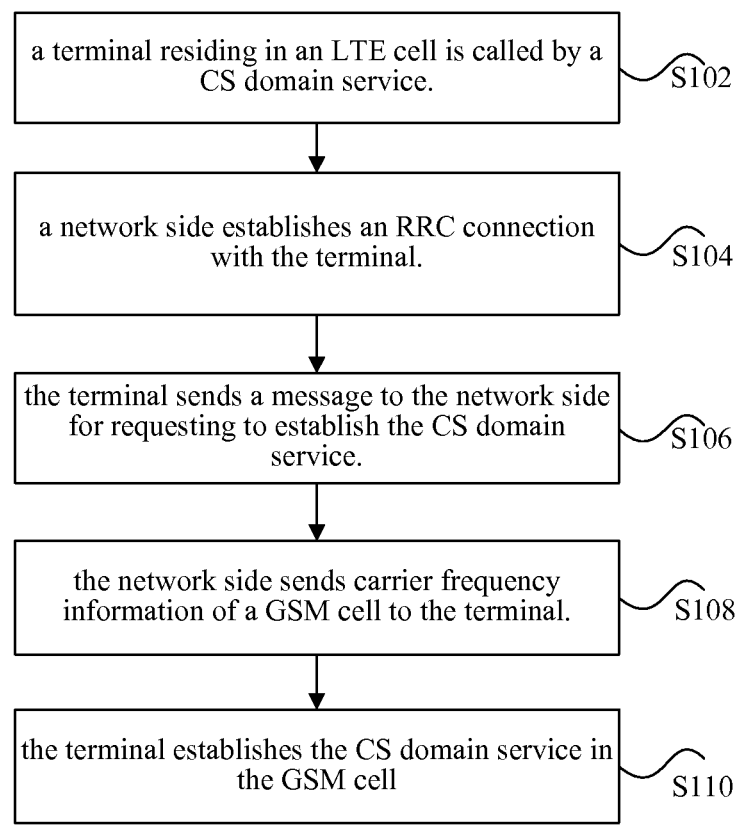
FIG. 1 is a flowchart of a method for processing of called terminal according to the first embodiment of the disclosure.

FIG. 1 is a flowchart of a method for processing of called terminal according to the first embodiment of the disclosure. The flow comprises the following steps:

Step 102: a terminal residing in an LTE cell is called by a CS domain service;

Step 104: a network side establishes an RRC connection with the terminal;

Step 106: the terminal sends to the network side a message for requesting to establish the CS domain service;

Step 108: the network side sends, to the network side, carrier frequency information of a GSM cell to which the terminal needs to be redirected (i.e. the carrier frequency information of the GSM is indicated); and Step 110: the terminal establishes the CS domain service in the GSM cell. Preferably, establishing the CS domain service in the GSM cell comprises: the terminal sending a channel request message to the GSM cell; the terminal performing routing area updating in the GSM cell; the terminal sending a paging response message to the GSM cell; and the terminal establishing the CS domain service in the GSM cell.

By performing the steps above, when being called by the CS domain service, the terminal residing in the LTE cell can return to a cell of a corresponding network to establish the CS domain service.

Preferably, the network side sends an RRC connection release message to the terminal, wherein the RRC connection release message carries the carrier frequency information of the GSM cell. By the RRC connection release message, the terminal can obtain the carrier frequency information of the GSM cell at one hand and release the LTE RRC connection at the LTE at the other hand, after receiving the message. Of course, the carrier frequency information of the GSM cell may be notified to the terminal via other messages. However, the use of other messages is not as convenient as that of the RRC connection release message. In this case, the RRC connection release message may carry a redirection message or a mobile control message in an idle state. The redirection message or the mobile control message in the idle state comprises the carrier frequency information of the GSM cell (i.e. the carrier frequency information of the GSM cell is indicated).

Preferably, the terminal may carry an extended service request message in an UL information transfer message sent to the network side, wherein the extended service request message is configured to request to establish the CS domain service. Of course, the network side may be notified by other messages, but the extended service request message is easier to be used.

Preferably, the network side sends a paging message to the terminal, wherein the paging message carries information configured to indicate that the terminal is called by the CS domain service.

Corresponding to the description above, an LTE system is further provided in the present embodiment, comprising: a network side and a terminal, wherein the network side is configured to send a paging message to a terminal residing in an LTE cell which is called by a CS domain service; and the terminal establishes an RRC connection with the network side; the terminal is configured to send to the network side a message for requesting to establish the CS domain service; the network side is further configured to send, to the terminal, radio frequency information of a GSM cell to which the terminal needs to be redirected; the terminal is further configured to send a channel request message to the GSM cell; the terminal is further configured to perform routing area updating in the GSM cell; the terminal is further configured to send a paging response message to the GSM cell; and the terminal is further configured to establish the CS domain service in the GSM cell.

Figure 2:
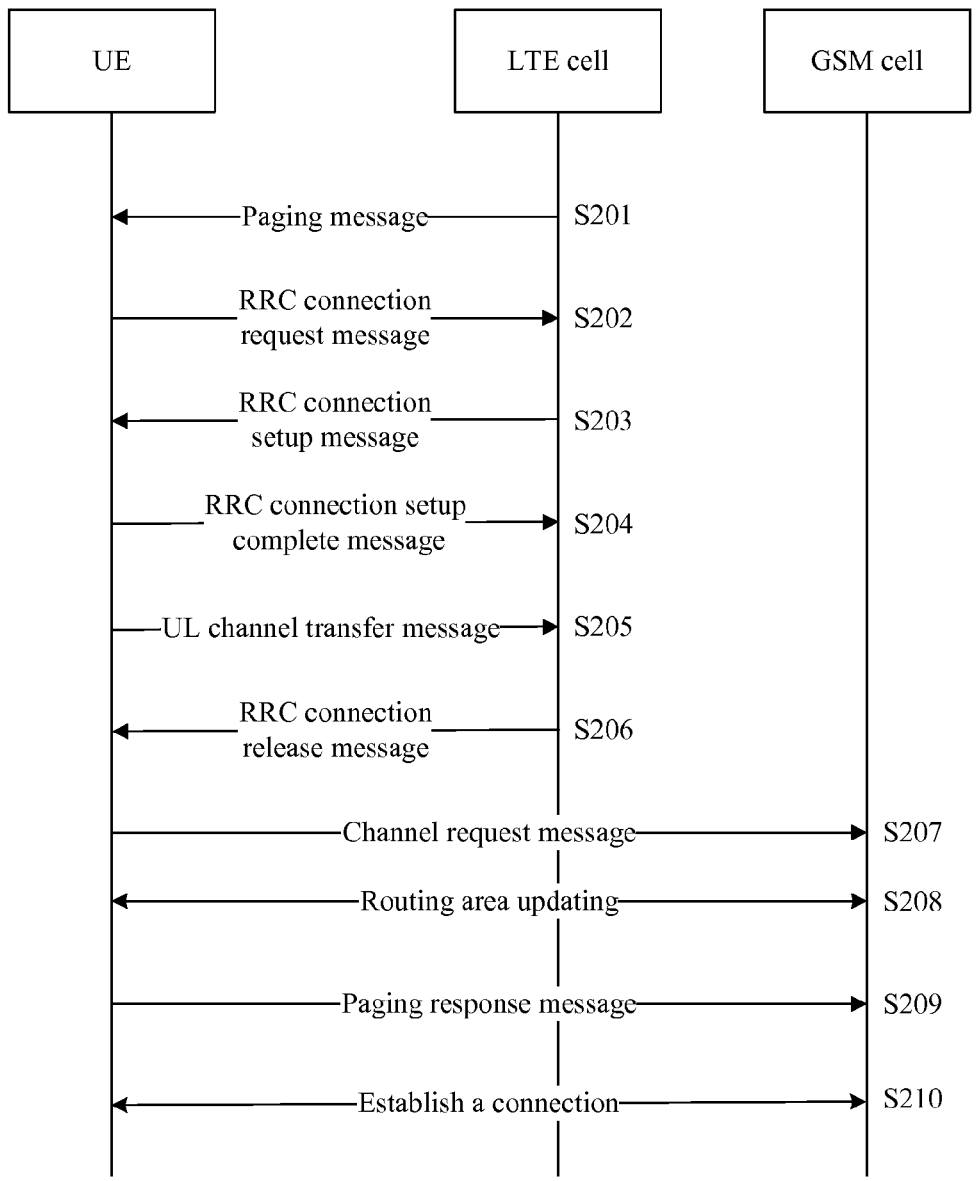
FIG. 2 is a preferred flowchart of a method for processing of called terminal according to the first embodiment of the disclosure.

FIG. 2 is a preferred flowchart of a method for processing of called terminal according to the first embodiment of the disclosure. The flow comprises the following steps:

Step 201: an LTE network side sends a paging message to a terminal;

Step 202: the terminal sends a paging response message and an RRC connection request message to the LTE network side;

Step 203: the LTE network side sends an RRC connection setup message to the terminal;

Step 204: the terminal sends an RRC connection setup complete message to the LTE network side;

Step 205: the terminal sends an UL information transfer message to the LTE network side, wherein the UL information transfer message sent by the terminal carries an EXTENDED SERVICE REQUEST message to request to establish the service;

Step 206: the LTE cell determines that the terminal needs to return to a GSM network to perform response to the call, the LTE network side sends an RRC connection release message to the terminal and the RRC connection release message carries redirection information indicating a carrier frequency of a GSM cell;

Step 207: the terminal reselects the cell indicated by the GSM carrier frequency and sends a channel request message to the GSM cell;

Step 208: the terminal performs routing area updating in the GSM cell;

Step 209: the terminal sends a paging response message to the GSM cell; and

Step 210: the terminal performs establishment of the CS domain service in the GSM cell as a called terminal.

In Step 208, that the terminal performs the routing area updating in the GSM cell may include the following operations:

Step a1: the terminal sends a routing area updating request;

Step b1: authentication and encryption are performed between the terminal and the network side;

Step c1: the network side returns a routing area updating reception message to the terminal; and Step d1: the terminal sends a routing area updating complete message to a network.

In Step 210, that the terminal performs establishment of the CS domain service in the GSM cell as a called terminal comprises the following operations:

Step a2: authentication and encryption are performed between the terminal and the network;

Step b2: the network sends a SET UP message to the terminal;

Step c2: the terminal returns a CALL CONFIRM message;

Step d2: the network sends a CONNECT message to the terminal;

Step e2: the terminal sends an ALERTING message to the network and alerting is performed;

Step f2: the terminal receives the call request;

Step g2: the terminal sends the CONNECT message to the network;

Step h2: the network sends an ASSIGNMENT COMMAND message to the terminal;

Step i2: the terminal sends an ASSIGNMENT COMPLETE message to the network; and

Step j2: a bi-directional transfer channel is established and the network sends a CONNECT ACKNOWLEDGEMENT message to the terminal.

Embodiment 2

In the present embodiment, a testing method for the solution provided in the first embodiment is provided. It should be noted that, any message involved in the first embodiment can be tested. Whether the message is sent and/or received successfully can be detected and a detection result can be returned. The testing method provided in the present embodiment performs detection for relatively important messages. Thus, it can guarantee that a network is working normally by the least testing processes. The testing method provided in the present embodiment may be applied in an actual network, or may be applied in a simulated system as well. When the method is applied in the simulated system, a terminal is connected to a system simulator via a GSM or LTE radio interface. The system simulator simulates an LTE cell or a GSM cell and verifies capability of the terminal according to a received terminal message.

Figure 3:
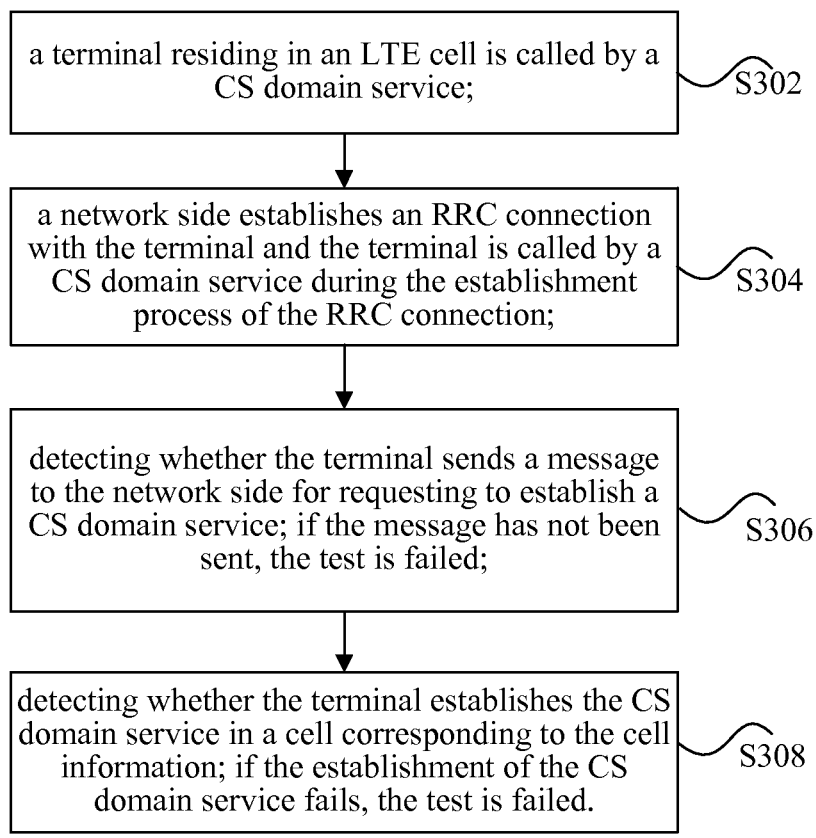
FIG. 3 is a flowchart of a method for testing of called terminal according to the second embodiment of the disclosure.

FIG. 3 is a flowchart of a method for testing of called terminal according to the second embodiment of the disclosure. The process comprises the following steps:

Step 302: a terminal residing in an LTE cell is called by a CS domain service;

Step 304: a network side establishes an RRC connection with the terminal;

Step 306: detecting whether the terminal sends to the network side a message for requesting to establish a CS domain service; wherein if the message has not been sent, the test is failed.

In this step, the network side sends to the terminal the carrier frequency information of a GSM cell to which the terminal needs to be redirected; and Step 308: detecting whether the terminal establishes the CS domain service in a cell corresponding to the cell information wherein if the establishment of the CS domain service is failed, the test is failed. In this case, the detection of the establishment of the CS domain service comprises: detecting whether the terminal sends a channel request message to the cell corresponding to the cell information wherein if the message has not been sent, the establishment of the CS domain service is failed.

Preferably, whether the terminal sends an UL transfer message to the network side, or whether the UL transfer message carries an extended service request message may be detected. In this case, the extended service request message is configured to request to establish the CS domain service. If the detection result is no, then the test is failed.

Preferably, in Step 308, whether the terminal sends a paging response message to a cell after routing area updating is performed for the cell may be further detected; and if not, the establishment of the CS domain service is failed.

Figure 4:
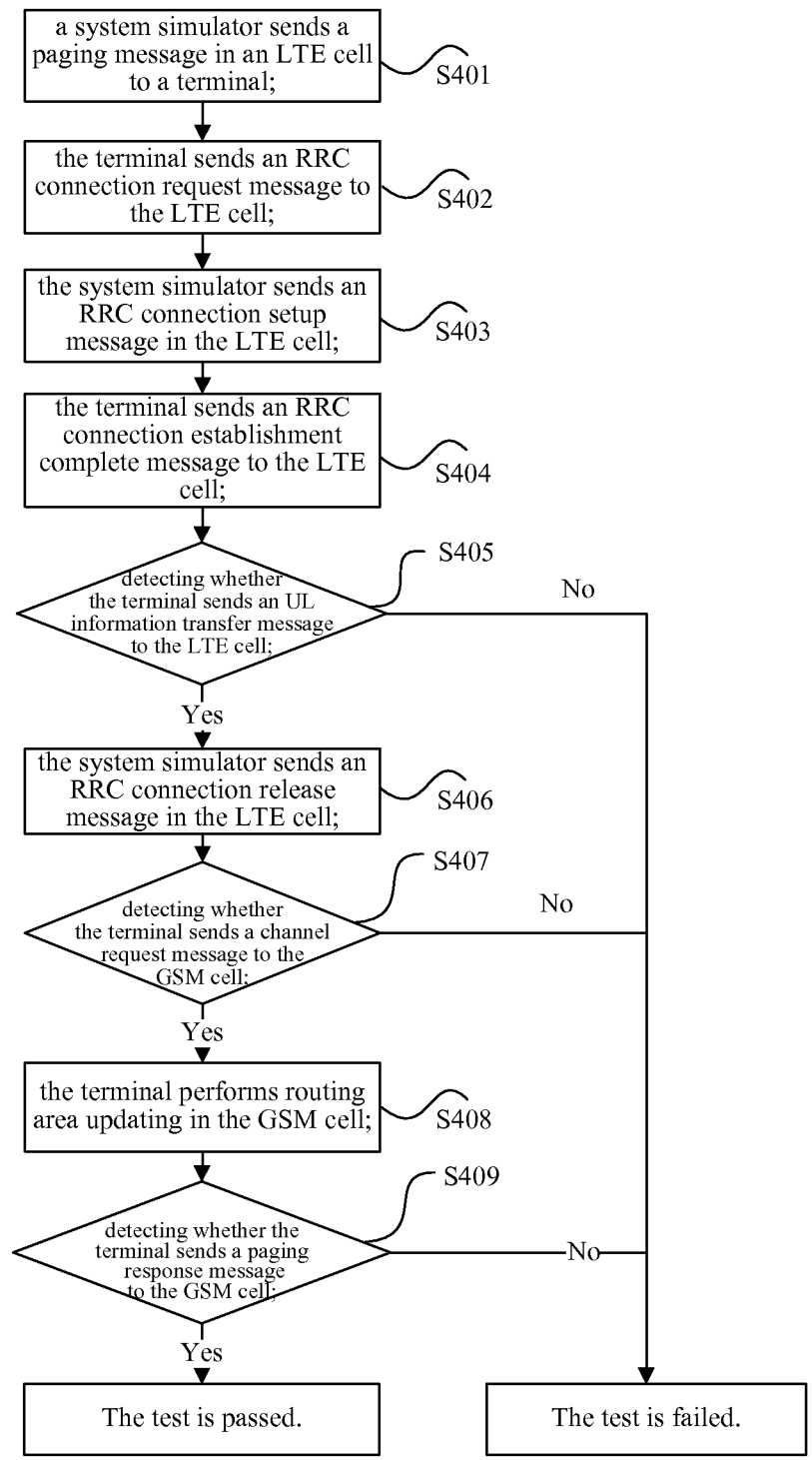
FIG. 4 is a preferred flowchart of a method for testing of called terminal according to the second embodiment of the disclosure.

Description is given below with the case that a CS domain service call is initiated in a GSM cell to a terminal as the example. FIG. 4 is a preferred flowchart of a method for testing of called terminal according to the second embodiment of the disclosure. The flow comprises the following steps:

Step 401: a system simulator sends, in an LTE cell, a paging message to a terminal;

Step 402: the terminal sends an RRC connection request message to the LTE cell;

Step 403: the system simulator sends an RRC connection setup message in the LTE cell;

Step 404: the terminal sends an RRC connection setup complete message to the LTE cell;

Step 405: detecting whether the terminal sends an UL information transfer message to the LTE cell, wherein if yes, the following operations are performed; and if it is detected that the message has not been sent, the test is failed;

Step 406: the system simulator sends in the LTE cell an RRC connection release message to the terminal, and the RRC connection release message carries redirection information indicating a carrier frequency of a GSM cell;

Step 407: detecting whether the terminal sends a channel request message to the GSM cell; wherein if yes, the following operations are performed; and if it is detected that the message has not been sent, the test is failed;

Step 408: the terminal performs routing area updating in the GSM cell; and

Step 409: detecting whether the terminal sends a paging response message to the GSM cell wherein if yes, the test is passed; otherwise, the test is failed.

In Step 405, the UL information transfer message sent by the terminal carries an extended service request message to request to establish a service. In this case, whether the UL information transfer message carries the extended service request message may be further detected; and if no, the test is failed and otherwise, the test is passed.

To sum up, by the above embodiments of the disclosure, the problem in the related technology that when a terminal residing in an LTE cell is called by a CS domain service, the LTE system cannot process the call, thus leading to a call failure. Thus, when called by the CS domain service, the terminal residing in the LTE cell can back to a cell of a corresponding network to establish the CS domain service. In addition, test can be performed effectively as well.

Obviously, those skilled in the art should understand that the modules or steps above of the disclosure may be implemented by general computing devices and centralized in a single computing device or distributed in a network consisting of multiple computing devices. Optionally, the modules or steps may be implemented by program codes executable by the computing devices, so that they may be stored in a storage device and executed by the computing device. In some cases, the steps as shown or as described may be executed according to a sequence different from the sequence herein, or the modules or steps may be respectively made into integrated circuit modules, or multiple modules or steps of these modules or steps may be made into a single integrated circuit module. By doing so, the disclosure is not limited to any specific combination of hardware and software.

The above are only preferred embodiments of the disclosure and should not be used to limit the disclosure. For those skilled in the art, the disclosure may have various modifications and changes. Any modifications, equivalent replacements, improvements and the like within the spirit and principle of the disclosure shall fall within the scope of protection of the disclosure.

What is claimed is:

1. A method for testing of a called terminal, comprising steps of:
    a network side of an Long Term Evolution (LTE) system sending a paging message to a terminal residing in an LTE cell which is called by a Circuit Switched (CS) domain service;
    receiving from the terminal a message establishing an Radio Resource Control (RRC) connection with the network side;
    detecting whether the terminal has sent to the network side a message for requesting to establish the CS domain service, wherein if the message has not been sent, the test has failed;
    the network side indicating carrier frequency information of a Global System for Mobile Communications (GSM) cell to which the terminal needs to be redirected;
    detecting whether the terminal has sent a channel request message in a GSM cell, wherein if the message has not been sent, the test has failed; and
    detecting whether the terminal has sent a paging response message to the GSM cell after routing area updating has been performed by the terminal in the GSM cell, wherein if the message has not been sent, the test has failed,
    wherein a system simulator simulates the LTE cell and the GSM cell, and the terminal is connected to the system simulator by an interface of the LTE cell or the GSM cell.

2. The method according to claim 1, wherein detecting whether the terminal has sent to the network side the message for requesting to establish the CS domain service comprises:
    detecting whether the terminal has sent an uplink (UL) information transfer message to the network side, and detecting whether the UL information transfer message carries an extended service request message, wherein the extended service request message is configured to request to establish the CS domain service.

* * * * *